(12) United States Patent
Cliff (10) Patent No.: US 6,746,246 B2
(45) Date of Patent: Jun. 8, 2004

(54) METHOD AND APPARATUS FOR COMPOSING A SONG

(75) Inventor: David Trevor Cliff, Bristol (GB)

(73) Assignee: Helwett-Packard Development Company, L.P., Houston, TX (US)

(*) Notice: Subject to any disclaimer, the term of this patent is extended or adjusted under 35 U.S.C. 154(b) by 85 days.

(21) Appl. No.: 10/206,835

(22) Filed: Jul. 29, 2002

(65) Prior Publication Data

US 2003/0022144 A1 Jan. 30, 2003

(30) Foreign Application Priority Data

Jul. 27, 2001 (GB) .............................. 0118448

(51) Int. Cl.[7] .......................... G09B 19/00; G09B 5/04; G10H 7/00
(52) U.S. Cl. .......................... 434/219; 434/319; 84/609
(58) Field of Search ................................ 434/219, 319, 434/307 A; 84/600, 609, 610, 611, 612, 613, 614, 615, 618, 622, 625

(56) References Cited

U.S. PATENT DOCUMENTS

| 5,753,843 A | 5/1998 | Fay |
| 6,060,655 A | 5/2000 | Minamitaka |
| 6,320,112 B1 * | 11/2001 | Lotze .......................... 84/615 |
| 2001/0041944 A1 * | 11/2001 | Iori .............................. 700/94 |

FOREIGN PATENT DOCUMENTS

| JP | 02002304494 A | * 10/2002 |
| KR | 2001069394 | * 7/2001 |

OTHER PUBLICATIONS

Japanese Publication No. 010296286 A, Nov. 29, 1989 w/Abstract.

* cited by examiner

Primary Examiner—John Edmund Rovnak (57) ABSTRACT

Songs are defined by a song template comprising at least one track comprising a sequence of measures and a plurality of audio samples allocated to the or each track. At least two songs are played to an audience, which responds indicating the popularity of each song. A less popular song is selected and a new song composed by automatically applying one or more rules to the template of the selected song.

26 Claims, 5 Drawing Sheets

| TRACK 1 | A | A |   | A | A |   | A | A |   | A | A |   |
|---------|---|---|---|---|---|---|---|---|---|---|---|---|
| TRACK 2 | B | A | B |   | B | A | B |   | B | A | B |   |
| TRACK 3 | C | A | C | B |   |   | C | A | B | C |   |   |
| TRACK 4 | C | C |   | C |   |   | C | C |   | C |   | C |

*Fig. 4*

| TRACK 1 | A | A |   | A | A |   | A | A |   | A | A |   |
|---------|---|---|---|---|---|---|---|---|---|---|---|---|
| TRACK 2 | B | A | B |   | B | A | B |   | B | A | B |   |
| TRACK 3 | D | A | D | B |   |   | D | A | B | D |   |   |
| TRACK 4 | D | D |   | D |   |   | D | D |   | D |   | D |

METHOD AND APPARATUS FOR COMPOSING A SONG

BACKGROUND OF THE INVENTION

1. Field of the Invention

This invention relates to apparatus for composing a song, and to a method of composing a song. It has particular relevance to adaptively modifying at least one original composed song to produce a more popular song. The song may, for example, be suitable for recording on a data carrier such as a compact disc, or for broadcast by a radio station. It will be understood that in the context of this application by song we mean any musical song or tune, with or without a vocal element, and with or without elements of melody or harmony, where the musical content of the song is at least partially comprised of predefined audio samples.

2. Description of Related Art

Many popular songs today are produced by stringing together predefined (usually pre-recorded) audio samples. This is especially true for dance music, where one or two short audio samples are played in sequence to form a part of a song. Samples are small phrases of sound, perhaps as short as a single drum beat but more usually lasting from one to maybe eight or sixteen measures at a particular tempo. These samples are most often copied from existing music produced by popular recording artists, such as a guitar phrase from a rock track, or a drum phrase from a reggae track. They are most often samples of audio produced by instruments but may also be samples of singing.

Often a song may be constructed which includes a track made up of a single sample (such as a four measure drum beat pattern lasting 8 seconds) repeated a large number of times during the duration of the song.

This style of music is now so widely accepted that the legalities of the use of the samples (such as obtaining copyright clearance) are readily understood. Furthermore, an entire industry has been established around the provision of sets of copyright free or "copyright cleared" samples which can be used by authors to produce new songs.

Until recently, composing a new song required the use of a sampler. This is a solid-state random-access audio recorder, trigerrable via MIDI from the keys of a keyboard. The samples are allocated to the keys and the user presses the keys in turn to play the samples in the preferred order from its memory. This requires a good degree of musicianship and strong keyboard skills to produce good results. There is now a variety of proprietary composing software available, which allows songs to be composed on a basic personal computer and played back in real time. Each of the available software packages differ in their detailed implementation but it is typical for the user to be presented with an "arrange" screen which displays the bars of a track onto which samples can be placed. The user can control the number of tracks, the tempo, and can choose which samples to place in each track. Once the samples have been dropped onto the screen the song can be played back to listen to the results. If the user is unhappy the samples can be moved around or replaced until a satisfactory result is obtained.

Although the composition of songs from samples is now very simple the user must still possess a great degree of skill and a good ear for music if a good song is to be produced. Samples cannot simply be placed at random in a track. Firstly, the user must judge when the tracks are to be silent or contain samples. Secondly, the individual samples must be chosen which must mix well with the other samples in the song.

At present, the author is not aware of any automated method of constructing good songs from samples. A computer cannot be readily trained to identify a good song from a bad song and so is unable to construct songs from samples.

BRIEF SUMMARY OF THE INVENTION

According to a first aspect the invention provides a method of automatically composing at least one musical song with a programmed processor comprising the steps of: defining and storing a set of songs which are each defined by a song template, the song template comprising at least one track comprising a sequence of measures and a plurality of audio samples allocated to the or each track, playing at least two of the songs to an audience; obtaining response signals from the audience indicating the popularity of each song with the audience; the programmed processor selecting at least one of the played songs in accordance with the popularity of that song with the audience; the programmed processor composing at least one song by automatically applying one or more rules to the template of the selected song, the rules modifying one or more characteristics of the template to produce a modified song; and the programmed processor replacing the less popular song with the composed modified song in the set of songs.

In a preferred arrangement, a song may be more likely to be selected for replacement the more unpopular a song is. The most unpopular song may always be selected. Otherwise, the song may be selected at random, perhaps with a weighting so that less popular songs are more likely to be selected, with the most popular song being the least likely to be selected. Other non-random selection strategies may be provided.

By utilising a measurement of the reaction of an audience to a set of initial songs and composing at least one song by automatically modifying at least one less popular song from the set the method can selectively compose a set of songs in such a way that unpopular songs are rejected over time. This will eventually leave a set of composed songs more popular than the initial set.

By automatically modifying the selected song we may mean that the rules are applied to the selected song without the need for human intervention to determine how the rules are applied.

The rules used to modify the selected song may include a rule whereby one or more of the characteristics of the song template for the selected song are replaced by one or more characteristics of at least one of the more popular songs from the set. This type of modification can be considered to be equivalent to a genetic recombination where the characteristics of a song template, such as the samples used, are equivalent to the genes of the song. Alternatively, the rules may comprise replacing one or more of the characteristic features of the template of a selected song at random with alternative characteristic features. For example, a sample may be replaced by a randomly selected alternative sample. This is the equivalent to a genetic mutation, which allows the song to evolve randomly over time. A combination of a mutation and a recombination may be applied to a selected song.

In a preferred method—in which samples or sets of samples or tracks are replaced with samples or sets of samples or tracks from a more popular song—the set of songs will evolve over time in an analogy to genetic evolution. They may be replaced with samples or sets of samples or tracks from more than one more popular song—just as animals are more likely to interbreed with fitter (more popular) mates to produce a more fit set of offspring.

In nature, forces such as the environment and predators determine which mutations and recombinations are successful. In the method of the invention the responses of the audience provide the equivalent force, which determines whether a song is modified or survives. Only the most popular songs will survive.

According to a second aspect the invention provides a song composition apparatus comprising: a memory containing a store of audio samples and a set of songs which are each defined by a song template, the song template comprising: at least one track comprising a sequence of measures and a plurality of audio samples allocated from the store of audio samples to the or each track, sound reproduction apparatus adapted to play at least two of the set of songs to an audience, one or more monitoring devices adapted to monitor the response of the audience to the played songs to provide crowd reaction signals representative of the popularity of each played song with the audience; a processor programmed to select on the basis of the crowd reaction signals at least one of the played songs which is less popular than at least one other played song, to compose at least one modified song by applying one or more rules to the template of the less popular song, the rules modifying one or more characteristics of the template to produce a modified song, and to replace the less popular song in the set with the composed modified song.

According to a still further aspect the invention provides a data carrier having stored thereon a composed song, wherein said composed song comprises the result of the selection of a song played to an audience and determined on the basis of the crowd reaction signals to be less popular than at least one other played song, the composition of a modified song by applying one or more rules to a template of the less popular song, the template comprising at least one track comprising a sequence of measures and a plurality of audio samples allocated to the or each track and the rules modifying one or more characteristics of the template to produce a modified song, and the provision of the modified song as the composed song.

According to a yet further aspect the invention provides a data carrier adapted to compose a song in response to user feedback, the programmed processor having access to a memory containing a store of audio samples and a set of songs which are each defined by a song template, the song template comprising at least one track comprising a sequence of measures and a plurality of audio samples allocated from the store of audio samples to the or each track, whereby the programmed processor is adapted to: select on the basis of crowd reaction signals representative of popularity of a song with at least a part of an audience at least one played song from a plurality of songs played to the audience which is less popular than at least one other played song; compose at least one modified song by applying one or more rules to the template of the less popular song, the rules modifying one or more characteristics of the template to produce a modified song; replace the less popular song in the set of songs with the composed modified song.

BRIEF DESCRIPTION OF DRAWINGS

There will now be described, by way of example only, one embodiment of the present invention with reference to the accompanying drawings of which.

DETAILED DESCRIPTION OF THE INVENTION

Several embodiments of song composition methods and apparatus will now be described. The different embodiments described are generally optimised for use in different circumstances or environments. Most detailed discussion is given to song composition by an automatic DJ at a nightclub, but the skilled person will appreciate how the teaching provided is appropriate to the other contexts to which the present invention can be applied.

Figure 1:
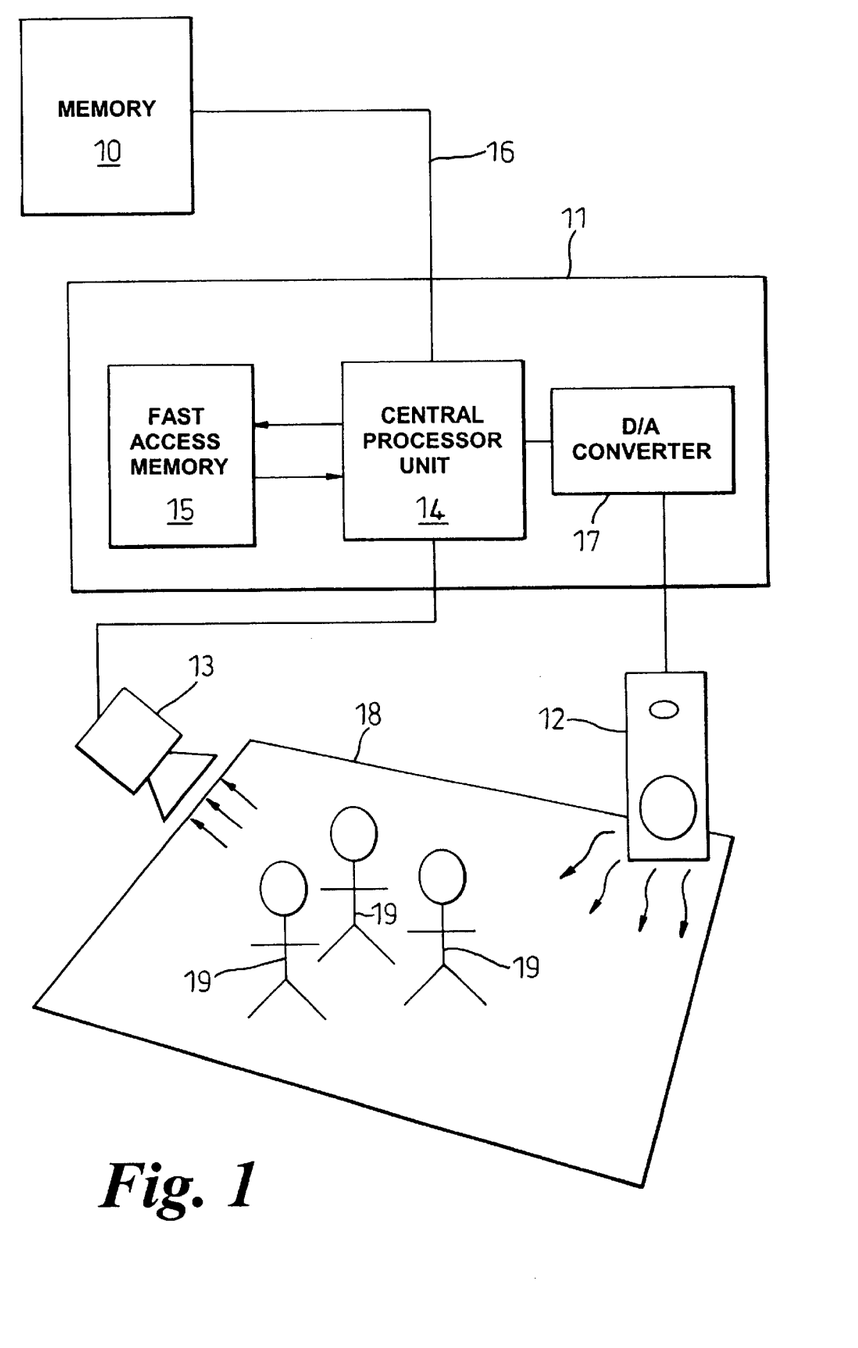
FIG. 1 is a schematic illustration of a first embodiment of an apparatus in accordance with the present invention.

The apparatus of the first embodiment is suitable for permanent installation in a nightclub. As illustrated in FIG. 1 of the accompanying drawings an automatic song composing apparatus comprises four main functional elements 10,11,12,13. The first unit 10 comprises a memory storage area in which audio samples are stored and into which composed songs can also be stored. The samples and the stored songs can be in either analogue or digital form. As shown, the memory comprises a stand-alone portable magnetic disk store such as a computer hard disc although samples can be stored on compact disc or any other form of storage media including solid-state memory.

Figure 2:
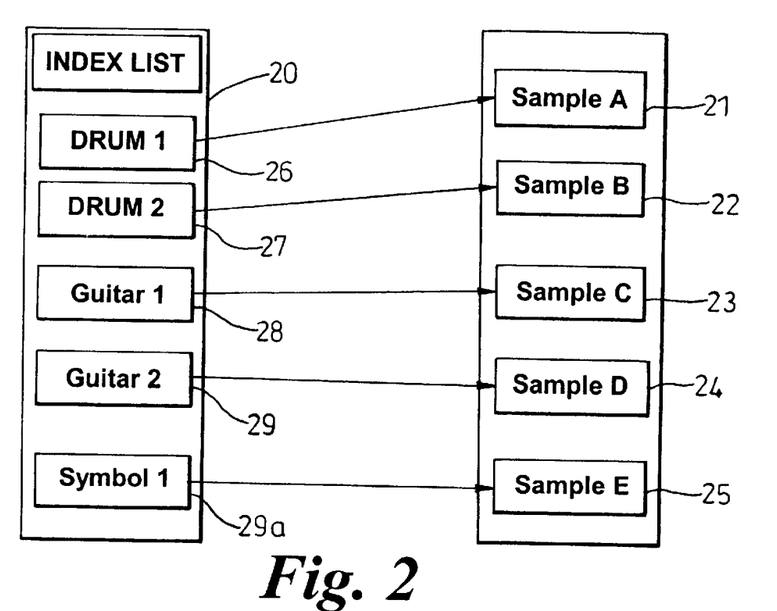
FIG. 2 illustrates a stored index list for a set of five stored samples.

The memory also stores an index list 20 and a compatibility list. For simplicity it is assumed that only five samples 21,22,23,24 and 25 are stored in the memory. In a practical application many hundreds or thousands of different samples will be stored. The index list 20 includes at least one data entry 26,27,28,29,29a for each sample 21,22,23,24,25 stored in the memory. Each data entry defines a single characteristic of the sample such as its length in beats, whether it is an instrument or a vocal sample, what the type of instrument is, whose voice it is etc. Again, in a practical application each entry may be multi-valued to provide information on many different characteristics of the samples. In the example, the entries define the type of instrument for each sample.

Figure 3:
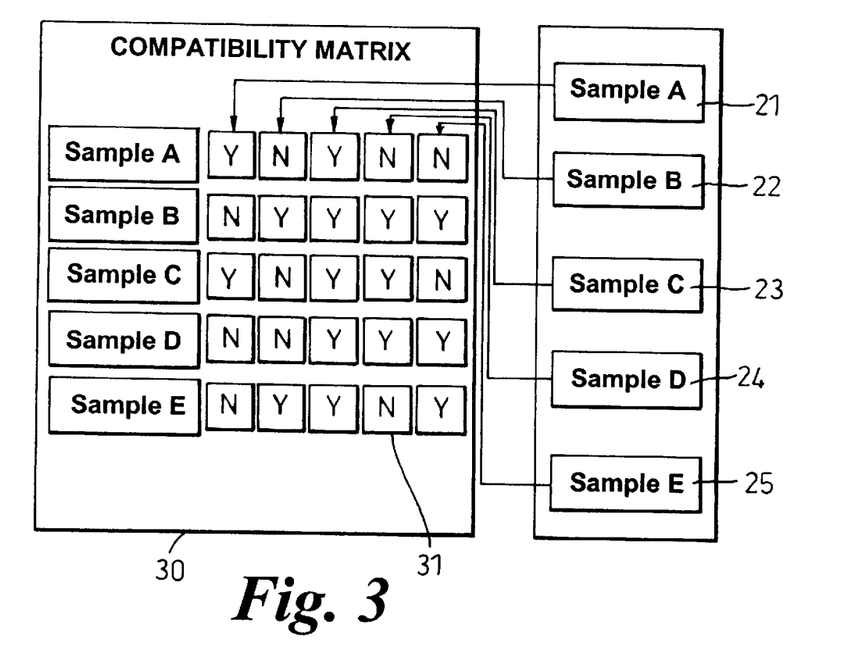
FIG. 3 illustrates a stored compatibility list for the stored samples.

An example of a stored compatibility list 30 is shown in FIG. 3 of the accompanying drawings. The compatibility list 30 includes at least one entry for each sample indicating the relative compatibility of that sample with another sample in the memory. As shown, the typical compatibility list 30 of the example is in the form of a five by five matrix of stored entries, each entry 31 in the matrix being a single compatibility value representing the compatibility of one sample with every other sample in the memory. For convenience, an entry shown as a Y indicates samples are compatible and N indicates they are incompatible.

A composing apparatus is also provided (the second element 11). This includes a central processing unit 14 and a small area of fast access electronic memory 15 in which program instructions (not shown) which are executed by the processing unit 14 are stored. The processing unit is connected to the memory 10 by an appropriate cable 16 which allows stored samples to be retrieved from the memory and composed songs to be written to the memory 1. The composing apparatus in this example is in the form of a personal computer (PC) which also includes a display (not shown) upon which prompts and instructions can be provided for a user by the processor. An input device, (also not shown) such as a keyboard, allows the user to control the operation of the central processing unit 14.

The third element 12 of the apparatus is a loudspeaker system through which songs stored in the memory can be played to a crowd. It is primarily envisaged that the loudspeaker will be installed by the dance floor in a nightclub allowing the songs to be played to a large captive audience of listeners. The processor is connected to the speaker through a digital to analogue converter 17. This may comprise a proprietary sound card added to a personal computer.

The final, fourth element 13, is a monitoring means which is this example comprises a video camera 13 which captures images of a dance floor 18 next to the loudspeaker. The camera 13 captures a stream of digital images in real time as songs are played through the loudspeaker and passes the digitised images along a suitable electrical cable to the central processing unit. The unit analyses the content of the images to identify the number of people 19 on the dance floor and produces a reaction value indicative of the reaction of the crowd to the played song. Pressure sensors may also be used in the dance floor (these may also effectively measure how vigorous the dancing is). Another simple alternative monitoring means may comprise one or more buttons located on or around a dancefloor, the audience pressing one button to show they like a song or the other to show they dislike a song. The method may count the number of times a button is pressed during the time a song is played. A song may be deemed popular if a relatively large number of people are dancing to it or listening to it or a listener selects the song more often. Conversely, it may be deemed relatively less popular if less people are dancing, or are listening to it or it is selected infrequently.

Of course, in a more sophisticated arrangement more than one monitoring device may be provided and the reaction of the crowd measured from more than one parameter (i.e. the number of people and amount of noise they are making or how vigorously they are dancing). In this regard, reference is made to the applicant's copending US Patent Application of even date entitled "Monitoring of Crowd Response to Performances", the contents of which are incorporated by reference herein.

The reaction of the audience may thus be monitored in real time as the songs of the set are playing.

Figure 4:
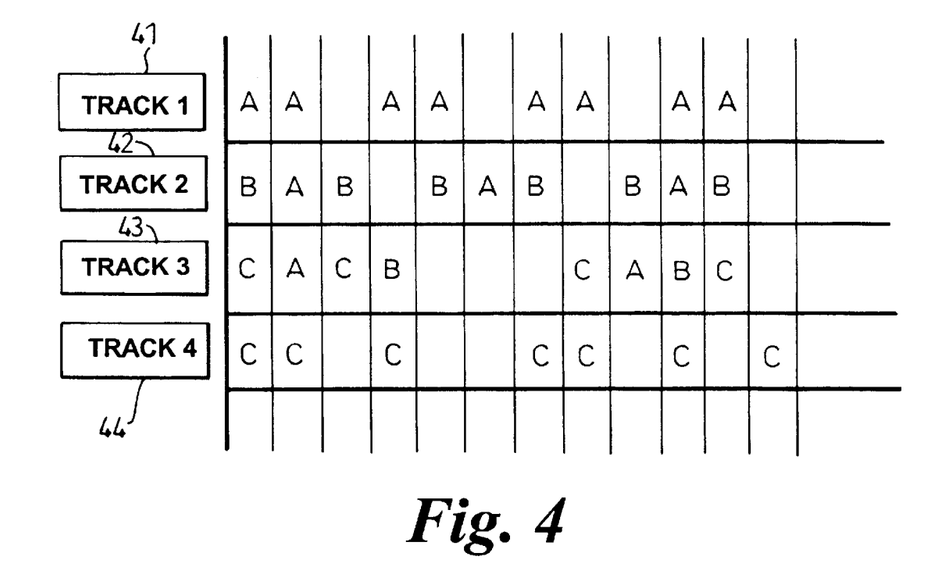
FIG. 4 shows a song template that is used to define a song.

Before the apparatus can be used to automatically compose a song, the processor must be provided with an initial set of songs which are each defined by a song template which is stored in the main memory 1. Typically, a set of twenty or perhaps thirty or more songs will be stored which can be played throughout the clubs opening hours. An example of an initial stored song template 40 is shown in FIG. 4 of the accompanying drawings.

The initial template 40 provides all the information required to construct a song from the samples stored in the memory and defines the following parameters of the song. The song length (in numbers of measures or seconds) must be defined, as well as the number of tracks 41,42,43,44 that make up the song. In the example, 4 tracks are defined. Within each track 41,42,43,44, samples selected from the memory are allocated. In the Figure there are three different samples used denoted A, B and C respectively.

It is envisaged that this initial stage will be performed manually by a composer. Of course, as the initial song will automatically be "improved" by the composing apparatus of the invention it need not be a perfect song and so the amount of skill required may be relatively minimal.

Figure 5:
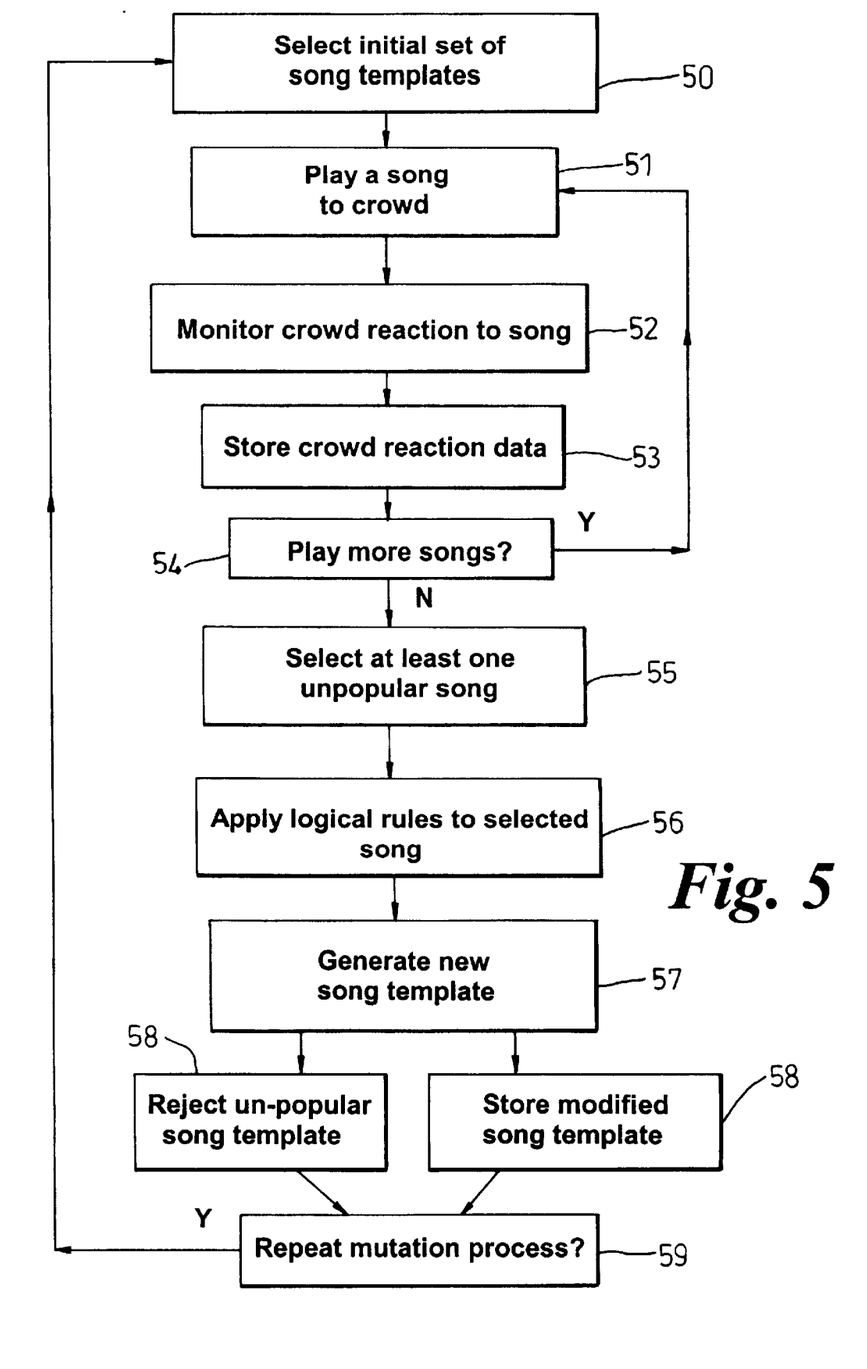
FIG. 5 is a flow diagram of the steps performed by the apparatus to automatically compose a song from an initial user-defined song template.

Having defined a suitable set of initial templates, the apparatus automatically composes at least one modified song from the initial stored song templates by performing the steps illustrated in FIG. 5 of the accompanying drawings.

In a first step 50, the processing unit selects the set of initial song templates from the memory. A song, or a subset of the songs, is played 51 to the audience through the loudspeakers and the reaction of the crowd is monitored 52 by the monitoring means. This provides a reference measurement of the reaction to each of the initial set of songs which is stored 53 in the memory 10. It is envisaged that a raw set of initial songs may not produce an over-enthusiastic reaction and could be improved. This is repeated 54 until all songs are played, or a preset number of songs are played (which may be a randomly generated number).

Where the songs are ranked the least popular song may be selected or any one of the less popular songs may be selected at random or pseudo-random whereby less popular song are more likely to be selected. Of course, more than one song may be modified at any one time.

Alternatively, an absolute reaction value may be assigned to each song, which varies over a range of values from very unpopular to very popular. A song may be selected for modification if it has an absolute popularity that falls below a predetermined absolute value. Indeed, all songs that fall below that value may be modified.

As the night goes on, a set of popularity values are produced for the songs and they can be ranked from "good" to "bad". According to preference, a song may be modified either when all songs in the set have been played at least once, or after each song has been played a predetermined multiple of times, or at a preset time interval. As a minimum two songs need to have been played to identify a more popular and a less popular song. Having determined the popularity of at least two songs in the set it is possible to select a song to modify.

In a next step the worst song or any of the less popular songs in the set is selected 55 for modification by the processor. Which song is selected will depend upon a set of predetermined selection criteria stored in the memory.

The processor then applies 56 a set of logical rules to the selected template to produce 57 a different template which corresponds to a modified song. To enable rules to be applied to the song template of the selected song, an identifier should be allocated to each sample in each song or to each phrase of samples in each song. The identifier may be indicative of at least one characteristic of a respective sample or phrase, or of more than one characteristic.

A non-exhaustive list of example characteristics of a sample that may be identified by an allocated identifier is:

the number of individual beats in the sample;

the instrument which made the audio sounds in the sample;

whether it is a vocal or instrument sample;

the length of the sample; and the pitch of the or each beat in a sample.

This new template is stored 58 in the memory 10 in place of the selected song. The rules essentially comprise recombining the selected song with parts of one or more popular songs from the set. The rules may be such that the most popular song contributes a lot of characteristics to the modified songs, followed by the next most popular song which contributes less characteristics and so on.

The modified song may differ only slightly from the first generation song in that one or more samples have been replaced by other samples from the memory which are contained in the more popular songs.

When replacing samples, the compatibility of one sample with another needs to be considered. The identifiers of samples can be used to determine whether two samples have equivalent characteristics.

A compatibility value may be generated for each identifier which indicates how compatible a sample or phrase is with other samples or phrases. This may be used by the rules when choosing which sample or phrase should be used to replace another sample or phrase.

A plurality of compatibility values may be generated which indicate the compatibility of every sample with every other sample. Each value may show the direct compatibility of one sample to replace another, or may identify whether a sample can also follow another sample or precede a sample in a song, or be played simultaneously with another sample. Compatabilities involving larger numbers of samples could also be generated.

The compatibility values may be modified in response to the monitored reaction of the audience to the songs. For example, a less popular song which contains sample A followed by (or preceded by) sample B may indicate that this sequence of samples is unpopular. The compatibility values should be modified to reflect this. In a subsequent modification, the low compatibility can be used by the rules to ensure that a selected song is modified in such a way that this sequence is not present in the song.

A truncation rule may also be generated for each sample or phrase of samples which indicates how it should be shortened if it is selected to replace a shorter sample in a song.

The rules may comprise replacing a sample in the selected song with a sample from a more popular song having an identifier which is indicative that the samples have at least one identical characteristic, i.e. both samples are drum samples, or both comprise three full beats, or both samples are vocal samples.

Figure 6:
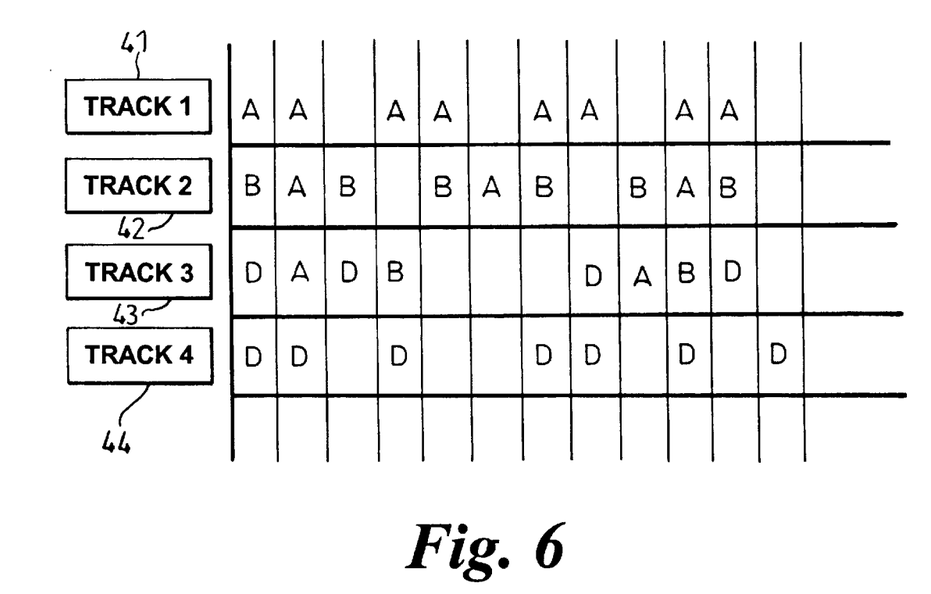
FIG. 6 shows a modified second-generation song template produced from the initial song template of FIG. 4.

FIG. 6 of the accompanying drawings illustrates a second-generation song produced from the song template of FIG. 4. All occurrences of sample C have been replaced by sample D.

The placement of samples in each track of a song may be defined by at least one regular expression for each track, generated from an appropriate context free grammar. In addition to replacing samples the method may comprise replacing one or more expressions generated by the context free grammar for a track with equivalent expressions selected from at least one more popular song. An identifier may be provided which indicates one or more characteristics of a phrase of samples.

For example, a track may comprise three samples ordered AAABBBCCC AAABBBCCC in time, with sample A played three times followed by sample B played three times followed by sample C played three times with that pattern played twice. An appropriate context free grammar could generate as a regular expression written $(A^3B^3C^3)^2$. In another example, A-AA-A may be written $(A-A)^2$.

The rules may replace an expression from a context free grammar with an expression having the same number of samples. Alternatively, samples in the expression may be replaced by other samples. In a further alternative, the power term in an expression may be replaced with a higher or lower order power, e.g. $(A^3B^3C^3)^2$ may become $(D^3E^3F^3)^2$, or $(A^3B^3C^3)^3$ or $(A^2B^2C^2)^2$.

Alternatively, one or more of the tracks may be omitted, or more tracks added. In effect, any parameter of the song as defined by the template may be changed.

One significant further way in which to modify a template is by use of audio filters. In songs consisting of repeated samples or sequences of samples, a known way to produce interesting musical effects is to apply an audio filter. Well known effects include echo, reverberation, flange, resonance and chorus—these are comprehensively discussed in the literature of sound recording. For example, chorus operates by creating the impression of multiple instruments by providing slight delays and variations in pitch for each "copy", and flanging operates by adding a copy of the signal with a very short and changing delay to itself. A template can therefore be modified by keeping the same samples or sequences of samples but by changing the filter parameters—either using different filters altogether, or changing how the filter parameters are used over the course of sample repetition (for example, by sweeping one or more parameters from one set of values to another over the duration of a sample loop, or by pulsing parameter values in a periodic fashion over the loop duration). Filters, or the use of filters, can be used as a template element in a similar fashion to samples, so that popular filters or filter uses can propagate through the set of songs.

It will be appreciated that the initial set of songs may each be initially characterised by a user-defined template. Thus, the method may initially comprise manually defining a first set of templates by defining a number of tracks, manually selecting which bars in the or each track contain samples, and manually allocating samples to the selected bars in the tracks. Of course, one or more of these steps may be automated, or one or more of the parameters may be fixed-such as a fixed number of tracks.

Of course, the initial set of songs may over time be replaced by a set of songs which have previously been produced by the method of the present invention, i.e. which include at least one composed modified song which has been mutated or recombined. Thus, the method may enable a set of songs to gradually evolve over time.

After performance of the song replacement step, the initial songs and the modified song now form a second-generation song set which can be used to replace the initial song set as the method is repeated. The new set of songs is played 56 to the crowd over the loudspeaker-perhaps at a later stage in the evening to the same crowd, or on a different day to a different crowd.

The reaction of the crowd to the played second-generation set of songs is then monitored and more songs can be charged.

The songs which are the least popular is again modified and the process is continued. The processor repeats the modification process, retaining the most popular songs from each generation until a predetermined number of mutations have occurred.

After each generation of mutation the user (i.e. the DJ or the nightclub owner) may be prompted to stop the process or allow a new modification to occur. This allows the user to decide when a song has been produced that can finally be recorded for replay to a wider audience. The user of the apparatus can be confident that the song will be popular due to the feedback from the continuous monitoring of each generation.

In a most convenient arrangement, each song that is played may form a part of a continuous or discontinuous mix of songs at an event such as a DJ set at the nightclub or at a festival. As the set continues, the apparatus rejects unpopular songs and plays songs that are recombined with and/or mutated from popular songs. The crowd determine how the mutations occur by influencing the decisions made by the processor. At the end of the event the last set of songs will almost entirely have been automatically composed as a result of the crowd reaction and may bear little or no resemblance to the initial song. Repeating the process with different crowds (i.e. on different nights) will possibly cause different mutations to be selected making the event a totally unique experience. Particularly popular songs, or the final set of songs at the end of the event, could then be provided to the crowd as a record of the event.

Another application of the method of the invention comprises playing the songs over a radio station (for example a digital radio station, an analogue radio station or an Internet radio station) where the audience comprises listeners to the radio station. The method allows unpopular songs to be replaced by more popular songs over time.

The popularity of a song may be determined by monitoring the number of people tuned to the station when a song is played or by asking the user to tell the station whether they like the song.

Unlike prior art play lists, where station managers regularly update the played songs in response to polls of the audience, the method of the present invention actually replaces unpopular songs with modified versions of the unpopular songs, which are more likely to be popular. The way in which the songs are modified is at least partially determined by the reaction of the audience not only to the unpopular song but also to more popular songs in the set.

Figure 7:
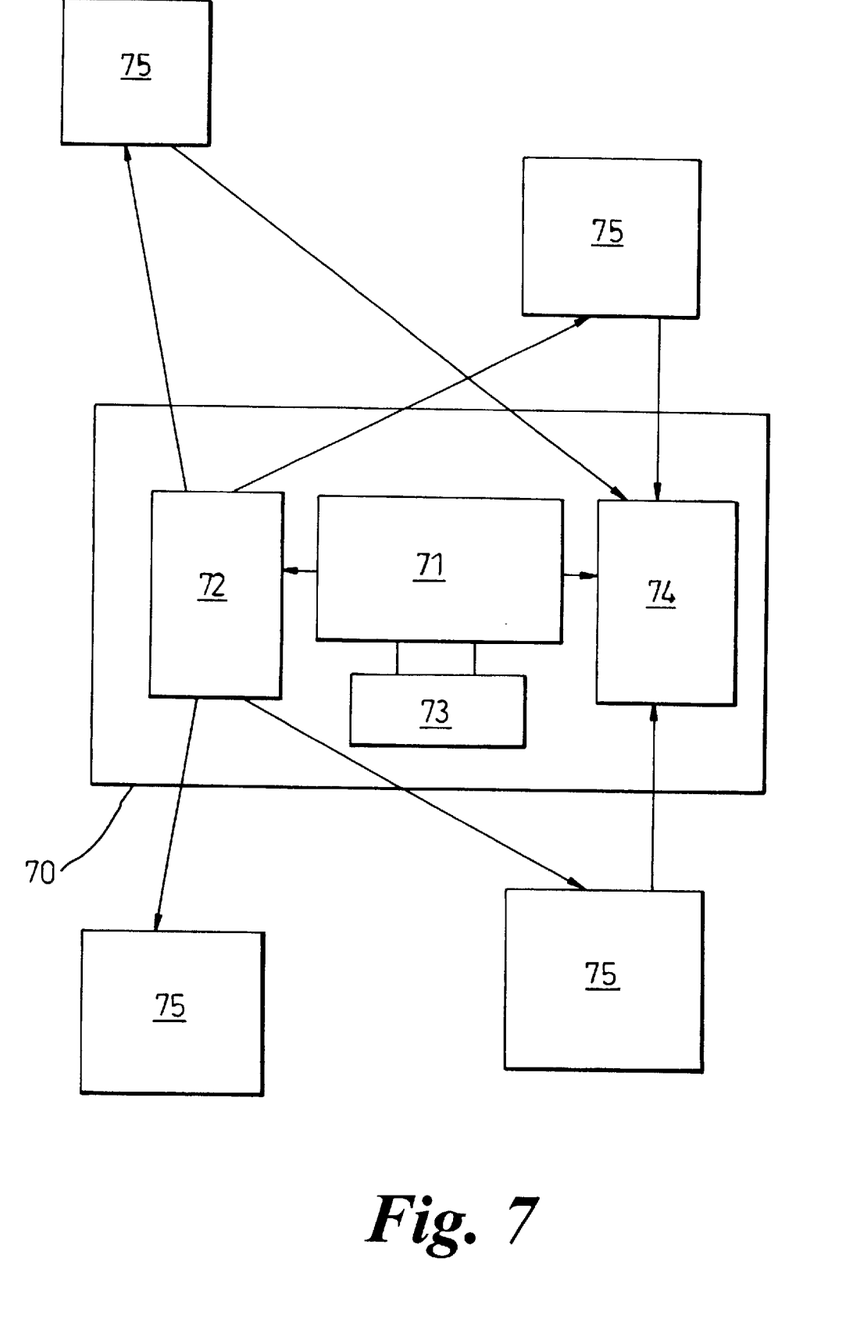
FIG. 7 shows a second embodiment of the present invention.

Such an alternative embodiment is illustrated in FIG. 7 of the accompanying drawings. In this arrangement the central processor, the sensors and loudspeakers have been replaced by an internet radio station 70 which broadcasts the songs in a set across the internet to an audience of listeners. Songs to be played are passed to a transmitter 71 from a central processor 72 which accesses songs from a memory 73. The memory 73 also stores the rules which are applied by the processor 72 to set of songs. Each listener listens to the songs using a personal computer 75. The monitoring means is provided by a receiver 74 at the radio station which monitors the number of people who listen to each song played in order to decide how popular a song is. This enables the songs in a set to be ranked and periodically the least popular songs can be recombined with the most popular songs to produce modified songs.

In a still further embodiment, the playback means may be associated with a personal computer or an MP3 player or a mobile telephone or the like in which case the audience may only comprise a single listener. The monitoring means may include at least one input device connected to the computer such as a mouse, or keyboard or joystick which can be operated by the listener to indicate their reaction to the played songs. This allows a set of songs stored on the computer to evolve over time to meet the preferences of the computer user.

The approach indicated above can be varied in a number of ways without departing from the spirit and scope of the invention. For example, the template for a song may be modified in real time as the song is playing, and unplayed portions of the modified song played in place of the portions of the unmodified song yet to be played. Songs could also be stopped altogether before their end if the reaction to them was particularly poor. Unpopular mutations would only be played for a short time before they are replaced with another song, and the songs gradually evolving in response to the crowd reaction.

What is claimed is:

1. A method of automatically composing at least one musical song with a programmed processor comprising the steps of:
    defining and storing a set of songs which are each defined by a song template, the song template comprising at least one track comprising a sequence of measures and a plurality of audio samples allocated to the or each track,
    playing at least two of the songs to an audience;
    obtaining response signals from the audience indicating the popularity of each song with the audience;
    the programmed processor selecting at least one of the played songs in accordance with the popularity of that song with the audience;
    the programmed processor composing at least one song by automatically applying one or more rules to the template of the selected song, the rules modifying one or more characteristics of the template to produce a modified song,
    and the programmed processor replacing the less popular song with the composed modified song in the set of songs.

2. A method according to claim 1 in which a song is more likely to be selected for replacement the more unpopular it is.

3. A method according to claim 1 in which the rules used to modify the selected song include a rule whereby one or more of the characteristics of the song template for the selected song are replaced by one or more characteristics of at least one of the more popular songs from the set.

4. A method according claim 1 in which the rules comprise replacing one or more of the characteristic features of the template of a selected less popular song at random with alternative characteristic features.

5. The method of claim 1 in which the characteristics of a template for a selected song which are modified include any or all of:
    the number of tracks;
    the type of samples in each track;
    the order of the samples in each track;
    the tempo of the selected song; and
    an audio filter applied to some or all of the samples on the track.

6. The method of claim 1 in which the rules that are applied to the characteristics of the template include one or more of:
    deleting at least one of the tracks of the song;
    adding at least one additional track to the song;
    altering the tempo of the song;
    replacing at least one sample with an alternative sample;
    replacing at least one set of samples with an alternative set of samples; and
    changing the application of an audio filter to some or all of the samples.

7. The method of claim 6 in which the template is modified by replacing one or more samples or sets of samples in a track with one or more different samples selected from more popular songs.

8. The method of claim 1 in which the reaction of the audience is monitored in real time as the songs of the set are playing.

9. The method of claim 1 in which the popularity of each song is determined as a relative value compared with the other songs so that the songs are ranked according to their popularity.

10. The method of claim 1 in which an absolute reaction value is assigned to each song which varies over a range of values from very unpopular to very popular and a song is selected for modification if it has an absolute popularity that falls below a predetermined absolute value.

11. The method of claim 1 which includes a step of allocating an identifier to each sample in each song or to each phrase of samples in each song, the identifier being indicative of at least one characteristic of a respective sample or phrase, or of more than one characteristic.

12. The method of claim 11 which further comprises replacing one or more samples in a song with one or more alternative samples from a more popular song having at least one related characteristic determined by their respective identifiers.

13. The method of claim 1 in which the songs initially present in the set of songs are each initially characterised by a user-defined template.

14. A song composition apparatus comprising:
   a memory containing a store of audio samples and a set of songs which are each defined by a song template, the song template comprising:
      at least one track comprising a sequence of measures and a plurality of audio samples allocated from the store of audio samples to the or each track,
   sound reproduction apparatus adapted to play at least two of the set of songs to an audience,
   one or more monitoring devices adapted to monitor the response of the audience to the played songs to provide crowd reaction signals representative of the popularity of each played song with the audience;
   a processor programmed to select on the basis of the crowd reaction signals at least one of the played songs which is less popular than at least one other played song, to compose at least one modified song by applying one or more rules to the template of the less popular song, the rules modifying one or more characteristics of the template to produce a modified song, and to replace the less popular song in the set with the composed modified song.

15. Apparatus according to claim 14 in which the programmed processor is adapted to delete the selected song from the memory.

16. Apparatus according to claim 14 in which the programmed processor is adapted to replace one song with a modified song so that the number of songs in the set remains the same.

17. Apparatus according to claim 14 in which the rules are stored in the same memory as the set of songs.

18. Apparatus according to claim 14 in which the rules used to modify the selected song include a rule whereby one or more of the characteristics of the song template for the selected less popular song are replaced by one or more characteristics of at least one of the more popular songs from the set.

19. Apparatus according to claim 14 in which the rules include a rule which comprises replacing one or more of the characteristic features of the template of a selected less popular song at random with alternative characteristic features.

20. Apparatus according to claim 14 in which the sound reproduction apparatus is arranged to play the songs to a crowd in a nightclub and the one or more monitoring devices are adapted to monitor the reaction of the crowd to the song.

21. Apparatus according to claim 14 in which the sound reproduction apparatus comprises a radio station and the one or more monitoring devices are adapted to monitor the listeners of the station.

22. Apparatus according to claim 14 in which the memory stores a ranking indicative of the relative popularity of each song in a set.

23. Apparatus according to claim 14 in which the memory stores an absolute reaction value assigned to each song, which varies over a range of values from very unpopular to very popular.

24. Apparatus according to claim 14 in which the memory further includes at least one set of sample characteristic indicators with each sample stored in the memory having at least one indicator associated with it that is indicative of at least one characteristic of its associated sample.

25. A data carrier having stored thereon a composed song, wherein said composed song comprises the result of the selection of a song played to an audience and determined on the basis of the crowd reaction signals to be less popular than at least one other played song, the composition of a modified song by applying one or more rules to a template of the less popular song, the template comprising at least one track comprising a sequence of measures and a plurality of audio samples allocated to the or each track and the rules modifying one or more characteristics of the template to produce a modified song, and the provision of the modified song as the composed song.

26. A data carrier adapted to compose a song in response to user feedback, the programmed processor having access to a memory containing a store of audio samples and a set of songs which are each defined by a song template, the song template comprising at least one track comprising a sequence of measures and a plurality of audio samples allocated from the store of audio samples to the or each track,
   whereby the programmed processor is adapted to:
      select on the basis of crowd reaction signals representative of popularity of a song with at least a part of an audience at least one played song from a plurality of songs played to the audience which is less popular than at least one other played song;
      compose at least one modified song by applying one or more rules to the template of the less popular song, the rules modifying one or more characteristics of the template to produce a modified song;
      replace the less popular song in the set of songs with the composed modified song.

* * * * *